(12) United States Patent
Hudson et al.

(10) Patent No.: US 7,024,631 B1
(45) Date of Patent: Apr. 4, 2006

(54) SYSTEM AND METHOD FOR ENABLING GRAPHICAL PROGRAM POLYMORPHISM

(75) Inventors: Duncan Hudson, Austin, TX (US); Erica Bono, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/569,863

(22) Filed: May 12, 2000

(51) Int. Cl.
*G09G 5/00* (2006.01)

(52) U.S. Cl. ............... 715/763; 715/771; 715/764; 715/762; 717/132; 717/105

(58) Field of Classification Search ......... 345/771, 345/762, 763, 835, 810, 703; 717/113, 103, 717/109, 138, 105, 125, 130, 132, 127, 133; 703/23; 707/503, 100, 102; 709/310, 328, 709/200; 715/762–765, 769, 771, 781, 805, 715/835, 839
See application file for complete search history.

(56) References Cited

U.S. PATENT DOCUMENTS

| 5,301,301 | A | | 4/1994 | Kodosky et al. | |
|---|---|---|---|---|---|
| 5,592,600 | A | * | 1/1997 | De Pauw et al. | 345/440 |
| 6,054,986 | A | * | 4/2000 | Kato | 345/763 |
| 6,437,805 | B1 | * | 8/2002 | Sojoodi et al. | 345/763 |
| 6,449,624 | B1 | * | 9/2002 | Hammack et al. | 707/203 |
| 6,593,947 | B1 | * | 7/2003 | Ashe et al. | 345/810 |

* cited by examiner

*Primary Examiner*—Tadesse Hailu
(74) *Attorney, Agent, or Firm*—Meyertons Hood Kivlin Kowert & Goetzel, P.C.; Jeffrey C. Hood; Jason L. Burgess

(57) ABSTRACT

System and method for enabling graphical program polymorphism. A "polymorphic node" to be included in a graphical program may be created and configured. A parameter interface that defines allowable inputs and outputs for the polymorphic node may be specified, and a set of functions or subprograms may be associated with the polymorphic node. The functions may have parameter interfaces that specify particular data types for the inputs/outputs of the functions. Once a polymorphic node is included in a graphical program, the node may be configured with typed inputs and outputs. The graphical programming system may determine a particular function associated with the polymorphic node to match the polymorphic node to, based on the data types of the configured inputs and outputs. This determination may also be based on an ordering specified for the set of functions associated with the polymorphic node. A best-fit heuristic for automatically making this determination is described. The user may also manually specify which function to match the polymorphic node to. The graphical program may be generated just as if the matched function were called directly, thus incurring no execution performance loss.

74 Claims, 23 Drawing Sheets

Exemplary data structure to represent
type distance between two data types:

```
{
    uInt32   m_loss;     //difference due to data loss (e.g., I16 to I8)
    uInt32   m_class;    // difference due to class (e.g. I16 to DBL)
    uInt32   m_name;     // difference due to td name
    uInt32   m_size;     // difference due to size (e.g. I16 to I32)
    uInt32   m_sign;     // difference due to sign (e.g. I16 to U16)
    uInt32   m_extra;    // an extra value to be defined by the caller
}
```

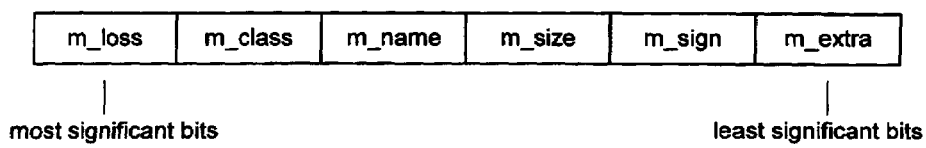

most significant bits                               least significant bits

Figure 11B

SYSTEM AND METHOD FOR ENABLING GRAPHICAL PROGRAM POLYMORPHISM

FIELD OF THE INVENTION

The present invention relates to the field of graphical programming, and more particularly to a system and method for enabling graphical program polymorphism.

DESCRIPTION OF THE RELATED ART

Traditionally, high level text-based programming languages have been used by programmers in writing application programs. Many different high level programming languages exist, including BASIC, C, FORTRAN, Pascal, COBOL, ADA, APL, etc. Programs written in these high level languages are translated to the machine language level by translators known as compilers or interpreters. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered the highest and most intuitive way in which to interact with a computer. A graphically based programming environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, data structures are automatically constructed which characterize an execution procedure which corresponds to the displayed procedure. The graphical program may be compiled or interpreted by a computer. Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, may be referred to as a virtual instrument (VI). In creating a virtual instrument, a user may create a front panel or user interface panel. The front panel includes various user interface elements or front panel objects, such as controls or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the graphical program, the user may select various function nodes or icons that accomplish his desired result and connect the function nodes together. For example, the function nodes may be connected in a data flow or control flow format. The function nodes may be connected between the terminals of the respective controls and indicators. Thus the user may create or assemble a data flow program, referred to as a block diagram, representing the graphical data flow which accomplishes his desired process. The assembled graphical program may then be compiled or interpreted to produce machine language that accomplishes the desired method or process as shown in the block diagram.

A user may input data to a virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others.

Although graphical programming differs in many ways from text-based programming, certain programming concepts apply to both programming styles. It may thus be beneficial to apply programming paradigms that have proved useful in text-based programming languages to the field of graphical programming languages. In particular, the object-oriented programming paradigm has become popular among text-based programmers and has proven to be a powerful and efficient programming methodology.

One element of text-based object-oriented languages that has heretofore been lacking in graphical programming systems is the concept of polymorphism. In general, polymorphism refers to the ability of functions, operators, or objects to behave differently or have different meanings, depending on their context. For example, a base class named "shape" may be defined in an object-oriented language, and classes such as "rectangle", "circle", "triangle", etc., may be derived from the shape base class. The derived classes may each implement a method called "area", where each method implementation is operable to use an appropriate formula to calculate the area for its respective type of shape. Given an object derived from the shape class, a programmer may simply invoke the object's area method, without regard to the specific class of the object.

A related concept of many text-based object-oriented languages is the concept of overloading. Overloading enables a function or operator to behave differently depending on the data type or class of its operand(s). For example, a "print" function may be defined or included in a programming language, and, when called, the function may display information in various ways, depending on the type or class of the operand(s) passed in.

The features of polymorphism and overloading may provide many benefits, such as enabling programmers to write programs more efficiently and at a higher level of abstraction, making code more readable, etc. It may thus be desirable to provide similar programming features for graphical programming systems. It may also be desirable to implement these features in a way that does not decrease the execution performance of a graphical program.

As described above, a graphical program may include visual elements such as nodes or icons (referred to collectively herein as nodes) that perform particular functions or operations. These nodes may be provided as features of a graphical programming system. For example, a graphical programming system may provide function nodes for performing common programming tasks, such as mathematical routines, input/output operations, system functions, etc. A graphical programming system may also provide libraries of function nodes for performing any of various types of specialized tasks, such as instrumentation test and measurement operations, image analysis operations, etc. A graphical programming system may also allow users to define nodes, such as subprogram nodes, to perform user-specified operations.

Graphical program nodes may have associated inputs and/or outputs, which roughly correspond to the parameters and operands of text-based programming languages. In various graphical programming systems, these inputs/outputs may be specified, represented, or illustrated in any of various ways. For example, as described above, a user may associate an input with a node by connecting or "wiring" an input to the node or to a terminal on the node. Similarly, a connection or wire from a node or from a terminal on a node may represent an output of the node. In other systems, inputs and outputs may not be visually connected to a node, but may be configured in other ways, e.g., by interacting with a user interface window or dialog box associated with the node.

Each input and output of a graphical program node may have an associated data type. A graphical programming system may support various data types, including standard types, such as integer, floating point, Boolean, etc., as well as custom or user-defined data types. Traditionally, graphical program node inputs and outputs have been associated with specific data types and have not been able to accept multiple data types. Thus, graphical programmers have often needed to include multiple nodes in a graphical program to accommodate different data types, even if the nodes perform very similar functions.

For example, FIGS. 1A and 1B illustrate prior art graphical program nodes for writing data to a configuration data file. For the node illustrated in FIG. 1A, the "value" input has a type of Boolean, while the corresponding input of the node illustrated in FIG. 1B has a type of signed integer. In the prior art, a program that needs to write both a Boolean value and a signed integer value to a system registry may, for example, need to include both of these nodes. It may thus be desirable for a graphical programming system to support "polymorphic" nodes with inputs/outputs that may map to various data types. Such polymorphic nodes may provide several benefits, such as increased code readability, increased ease of program maintenance, faster program development time, etc.

U.S. Pat. No. 5,301,301, to Kodosky et al, discloses a graphical programming system supporting built-in functions that are polymorphic with respect to data type. However, this patent does not disclose a system or method enabling a user to define custom polymorphic nodes, such as subprogram nodes. Therefore, a graphical programming system that supports user-defined polymorphic nodes is desired.

SUMMARY OF THE INVENTION

The problems outlined above may in large part be solved by providing a system and method for enabling a concept referred to herein as graphical program polymorphism. A user may create and configure a "polymorphic node" to be included in a graphical program. A parameter interface that defines allowable inputs and outputs for the polymorphic node may be specified. However, these inputs and outputs are preferably not associated with particular data types. The user may associate a set of functions or subprograms with the polymorphic node. Each associated function may also have an associated parameter interface that defines allowable inputs and outputs for the function. The parameter interfaces for the set of associated functions may specify particular data types for the inputs/outputs of the functions.

Once a user has created a polymorphic node, the polymorphic node may be included in a graphical program diagram. (The user may also use pre-defined polymorphic nodes provided as part of the graphical programming system.) The polymorphic node may be configured with typed inputs and outputs. The graphical programming system may determine a particular function associated with the polymorphic node to match the polymorphic node to, based on the data types of the configured inputs and outputs. This determination may also be based on an ordering specified for the set of functions associated with the polymorphic node. When the graphical program is executed, the function that the polymorphic node is matched to may be executed.

Any of various algorithms or heuristics may be utilized in matching the polymorphic node to a particular function. An exemplary best-fit heuristic for automatically making this determination is described. The user may also manually specify which function to match the polymorphic node to.

For a graphical programming system that supports strongly-typed graphical programs, the polymorphic node may be matched to a particular function at edit-time or compile-type. Thus, in such an embodiment, no executable code may be generated for the polymorphic node, but rather, a program may be generated just as if the matched function were called directly. Thus, the use of polymorphic nodes may incur no execution performance loss.

BRIEF DESCRIPTION OF THE DRAWINGS

A better understanding of the present invention can be obtained when the following detailed description of the preferred embodiment is considered in conjunction with the following drawings, in which:

FIGS. 11a–11c are diagrams illustrating one embodiment of a method for automatically matching a polymorphic node to an associated function;

FIG. 12 illustrates an exemplary user interface enabling a user to manually specify which function to match a polymorphic node to;

Figure 1A:
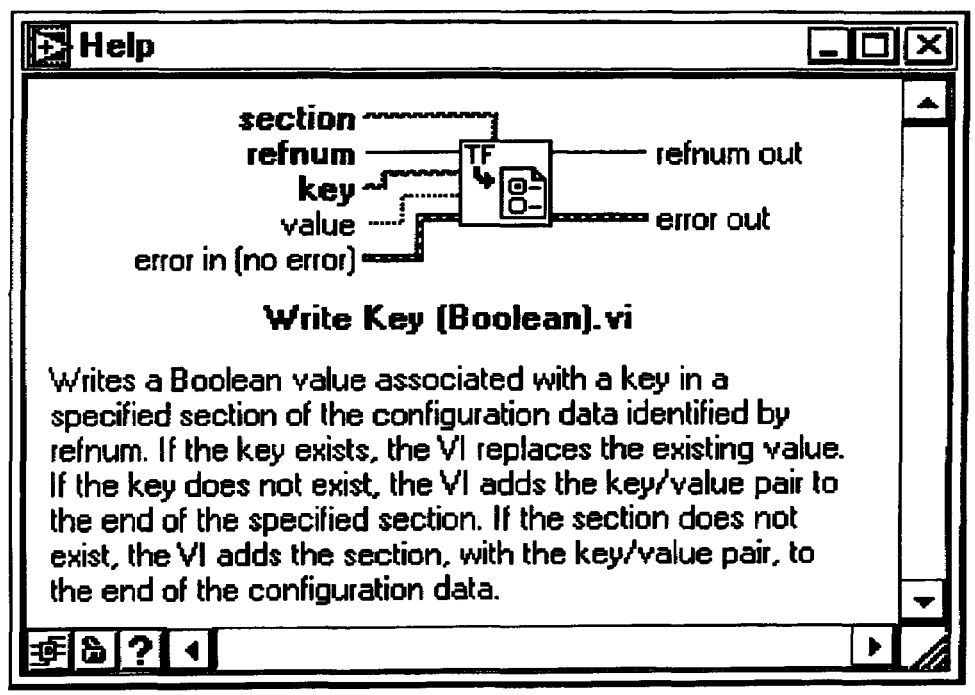
FIGS. 1A and 1B illustrate prior art graphical program nodes.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2A:
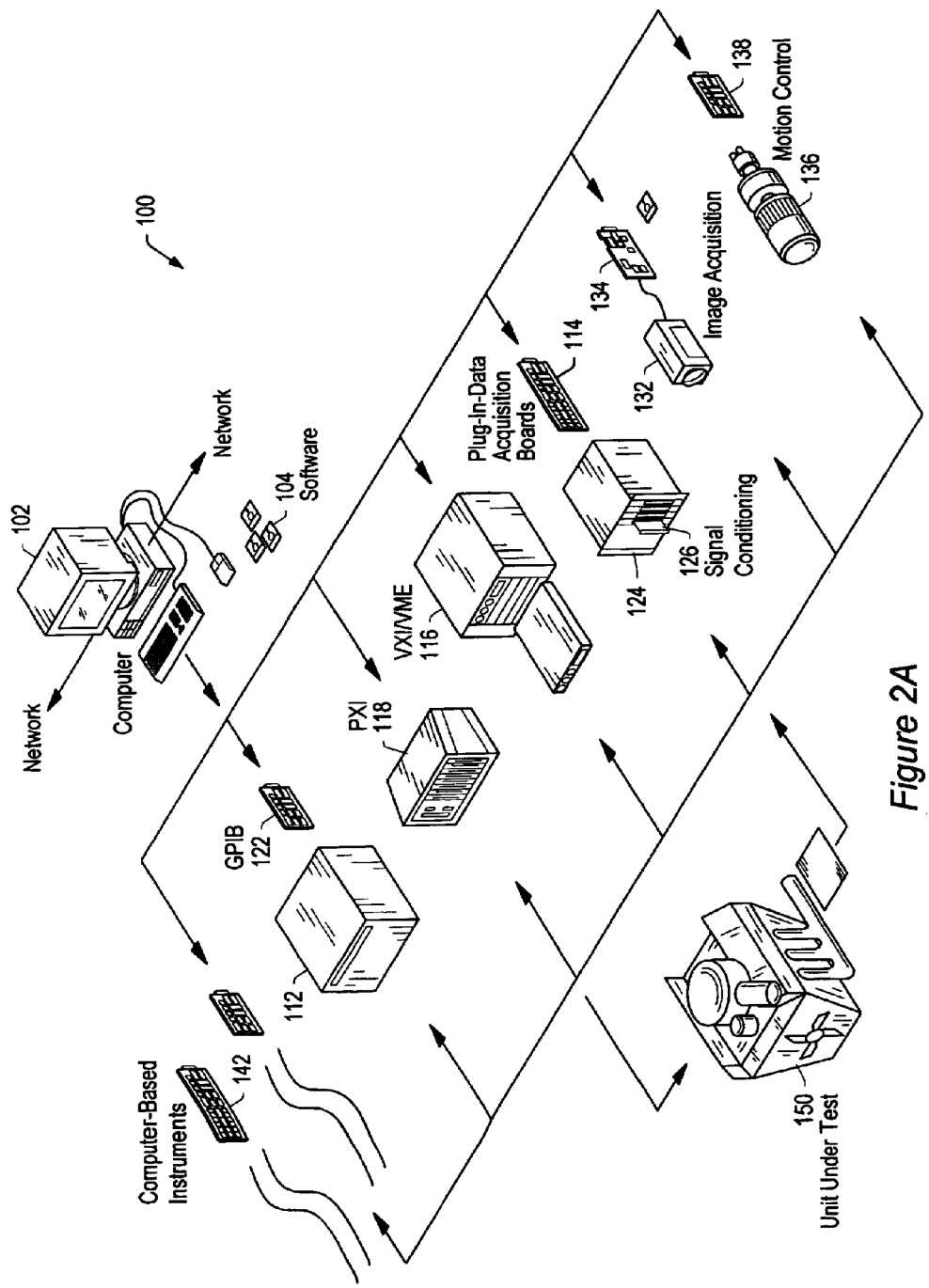
FIGS. 2A and 2B illustrate representative instrumentation and process control systems including various I/O interface options.
Figure 2B:
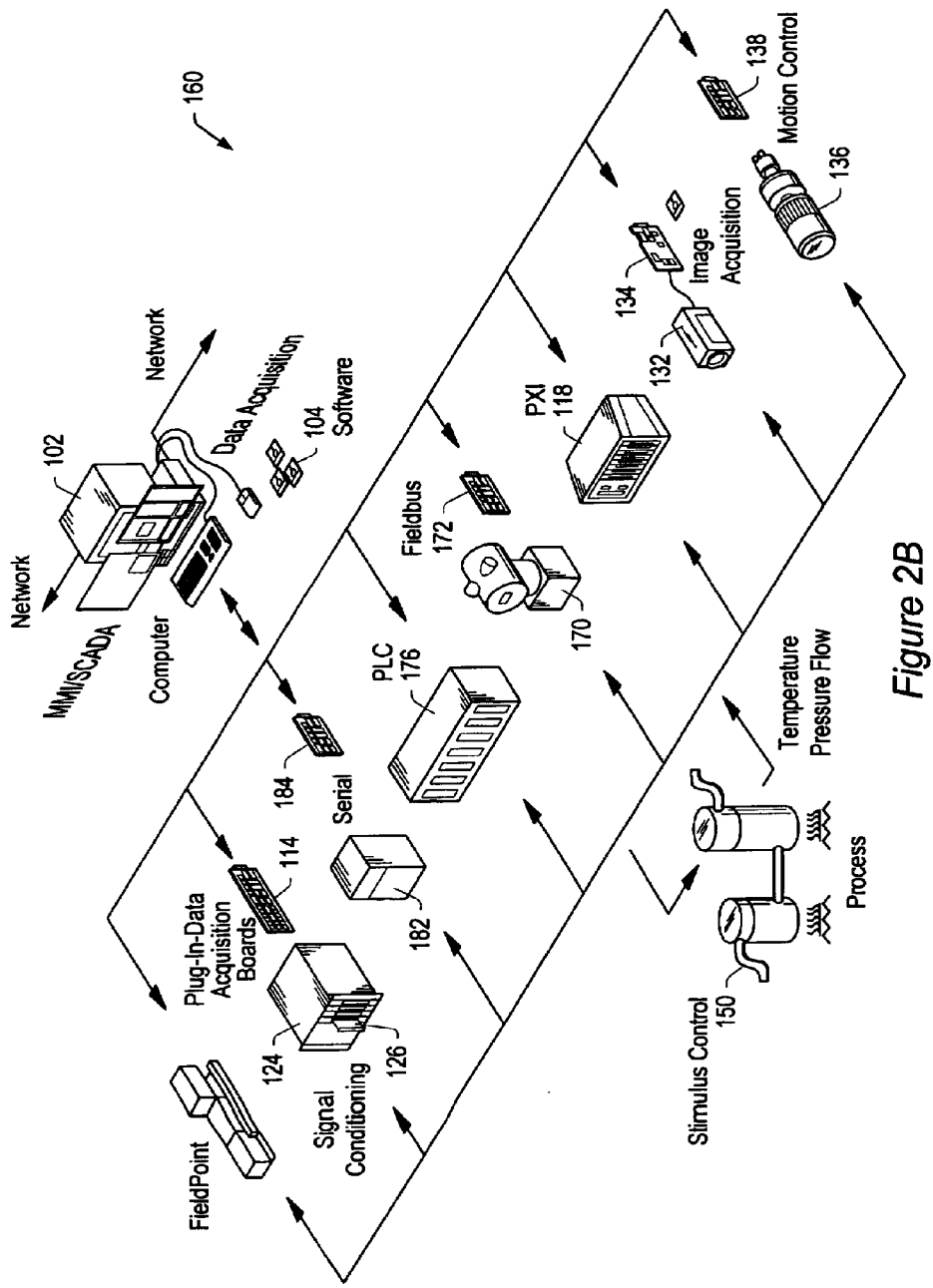

FIGS. 2A and 2B—Instrumentation and Industrial Automation Systems

FIGS. 2A and 2B illustrate exemplary systems that may store or execute graphical programs for instrumentation, process control, or other purposes, wherein the graphical programs utilize polymorphic nodes, as described herein. These programs may of course be stored in or used by other types of systems as desired. Thus, the present invention may be used in any of various types of systems, and FIGS. 2A and 2B are exemplary only.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard, as shown. The host computer 102 connects through the one or more instruments to analyze, measure, or control a unit under test (UUT) or process 150. The host computer 102 may execute a graphical program which interacts with or controls the one or more instruments, wherein the graphical program comprises one or more polymorphic nodes, as described below. The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may execute a graphical program that is involved with the automation function performed by the automation system 160. Similarly as described above with reference to FIG. 2A, the graphical program may comprise one or more polymorphic nodes.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory or random access memory such as DRAM, SRAM, EDO RAM, RRAM, etc., or a non-volatile memory such as a magnetic media, e.g., a hard drive, or optical storage. The memory medium may comprise other types of memory as well, or combinations thereof.

In addition, the memory medium may be located in a first computer in which the programs are stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, a graphical program that is constructed as described herein may be designed for data acquisition/generation, analysis, and/or display, and for controlling or modeling instrumentation or industrial automation hardware. For example, in one embodiment, the graphical program may be created using the National Instruments LabVIEW graphical programming environment application, which provides specialized support for developers of instrumentation and industrial automation applications. However, it is noted that the present invention can be used for a plethora of applications and is not limited to instrumentation or industrial automation applications. In other words, FIGS. 2A and 2B are exemplary only, and graphical programs for any of various purposes may be stored in and execute on any of various types of systems.

Figure 3:
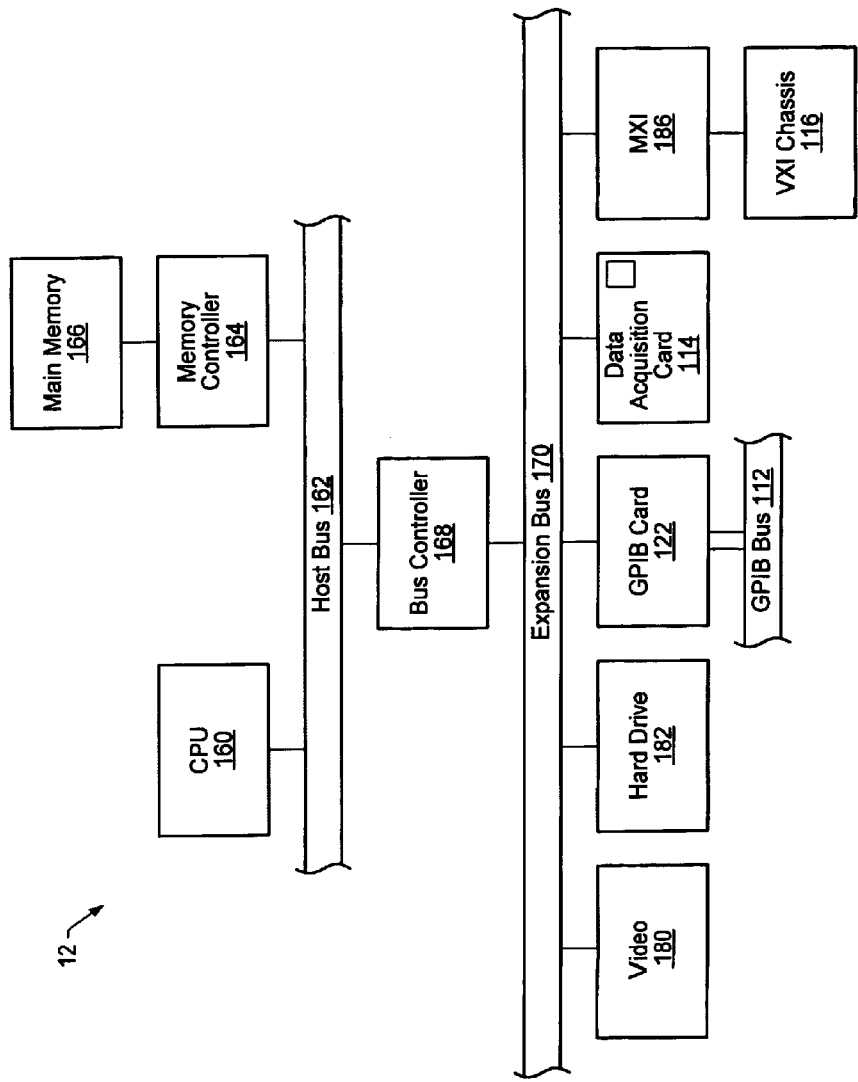
FIG. 3 is a block diagram of the computer system of FIGS. 2A and 2B.

FIG. 3—Computer System Block Diagram

FIG. 3 is an exemplary block diagram of the computer system illustrated in FIGS. 2A and 2B. It is noted that any type of computer system configuration or architecture can be used in conjunction with the system and method described herein, as desired, and FIG. 3 illustrates a representative PC embodiment. It is also noted that the computer system may be a general purpose computer system such as illustrated in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store one or more computer programs according to the present invention. The main memory 166 also stores operating system software as well as the software for operation of the computer system, as well known to those skilled in the art. The computer programs of the present invention are discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 4:
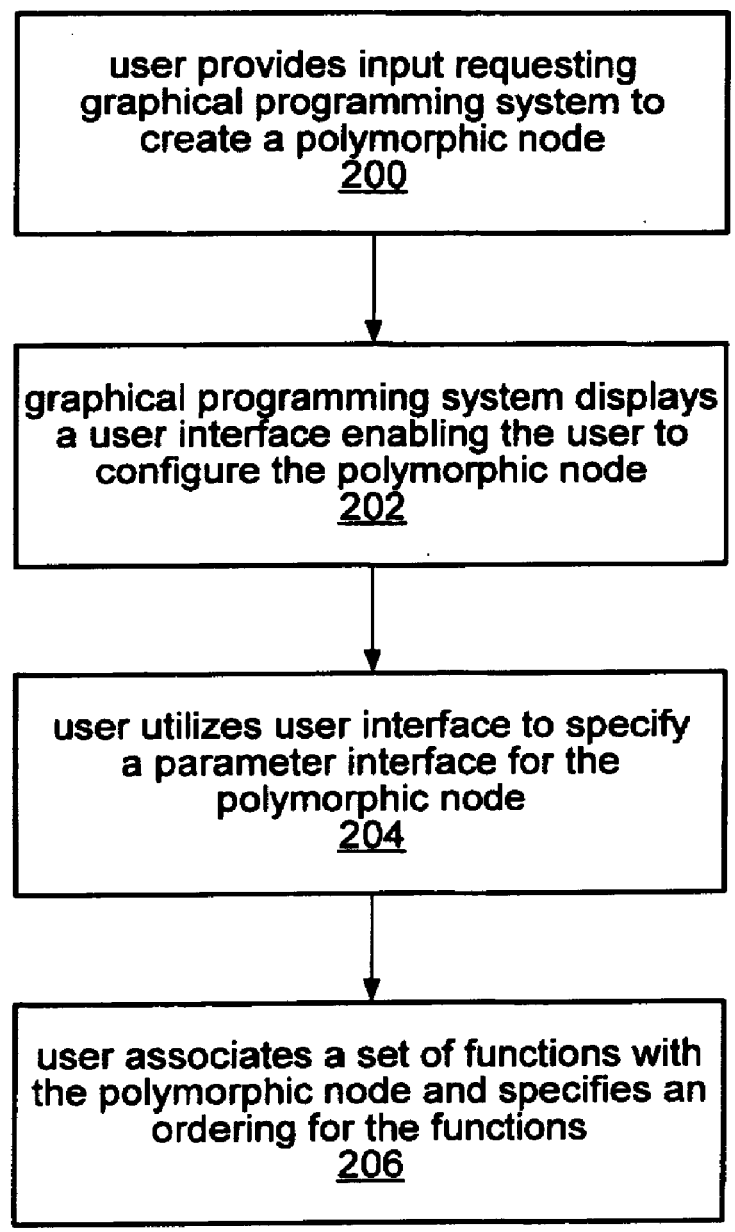
FIG. 4 is a flowchart diagram illustrating one embodiment of a method for creating and configuring a polymorphic graphical program node.

FIG. 4—Creating and Configuring a Polymorphic Node

Figure 5:
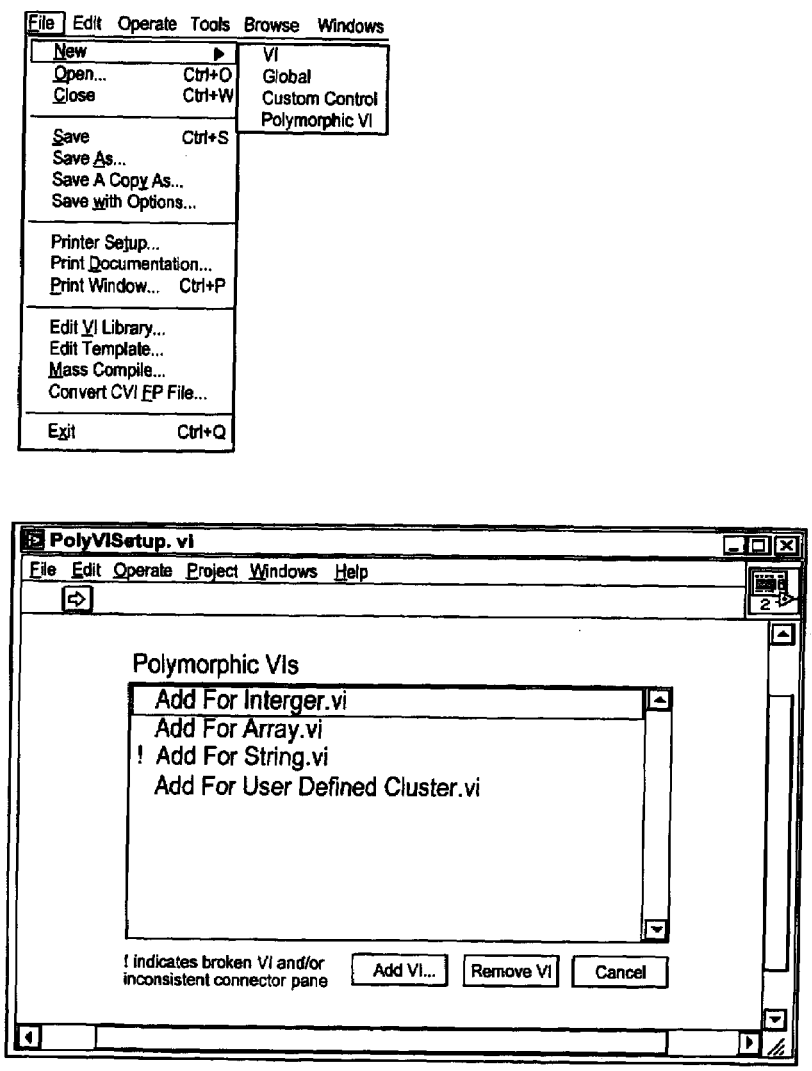
FIG. 5 illustrates an exemplary user interface for creating a new polymorphic node.

FIG. 4 is a flowchart diagram illustrating one embodiment of a method for creating and configuring a polymorphic graphical program node. In step 200, a user provides input requesting a graphical programming system to create the polymorphic node. For example, the graphical programming system may include a user interface with a menu bar option for creating a new polymorphic node, as shown in FIG. 5. The new polymorphic node may automatically be included in a graphical program, e.g., a program that is currently being edited, or may not be automatically associated with a particular graphical program, but may later be included in a graphical program. Step 200 may be performed in any of various other ways. For example, the user may drag and drop a new polymorphic node into a graphical program from a palette.

Figure 6:
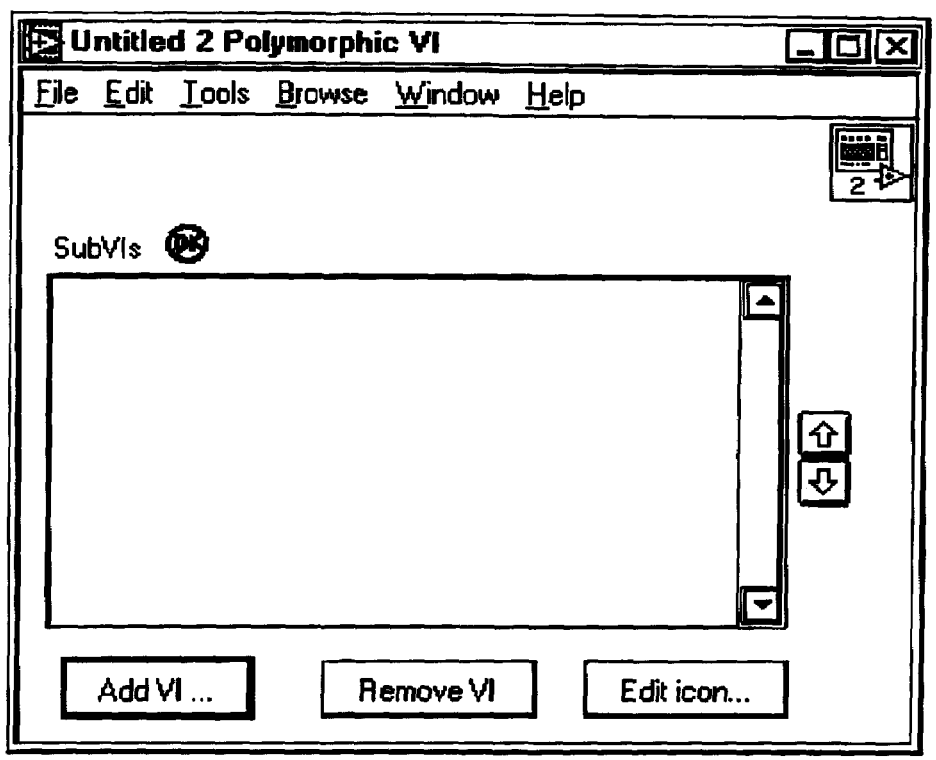
FIG. 6 illustrates an exemplary user interface for configuring a polymorphic node.

In step 202, the graphical programming system may display a user interface in response to the user request in step 200, wherein the user interface enables the user to configure the polymorphic node. Alternatively, the graphical programming system may simply create and/or display the polymorphic node, and the user may later request the system to display a user interface for configuring the polymorphic node. The user interface for configuring the polymorphic node may take on any of various forms. FIG. 6 illustrates one embodiment of a user interface for configuring the node.

The polymorphic node configuration user interface may enable the user to specify a parameter interface for the polymorphic node. This parameter interface may define the number of allowable inputs and/or outputs that may be associated with the node. However, since a polymorphic node is intended to be operable to receive and produce inputs and outputs of various data types, the parameter interface may not associate particular data types with the inputs/outputs. In step 204 the user utilizes the configuration user interface to specify the desired parameter interface. It is noted that the parameter interface may allow optional inputs/outputs to be associated with the polymorphic node. Optional inputs/outputs are discussed below.

Figure 7:
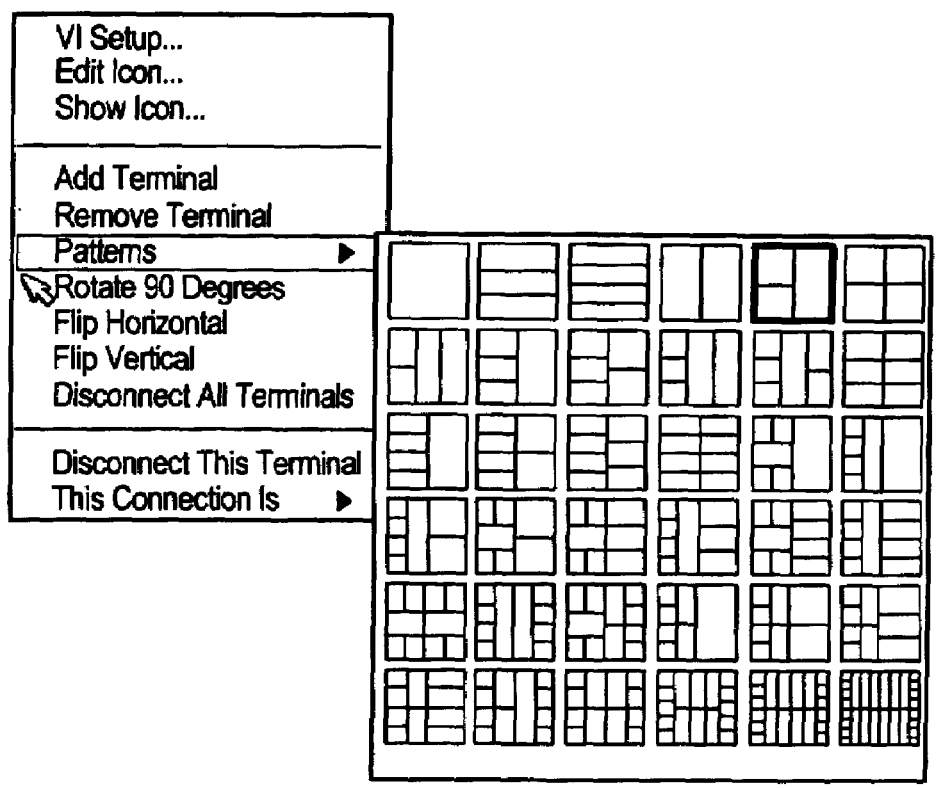
FIG. 7 illustrates an exemplary user interface for selecting a connector pattern for a polymorphic node.
Figure 16A:
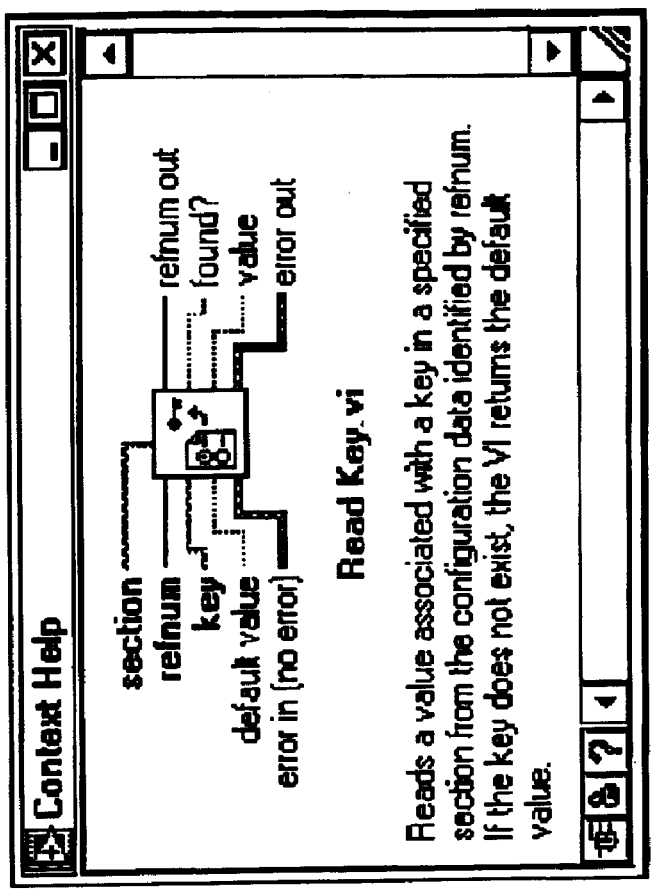
FIGS. 16A–16C illustrate graphical program fragments utilizing one of the polymorphic nodes shown in FIG. 15.
Figure 16A:
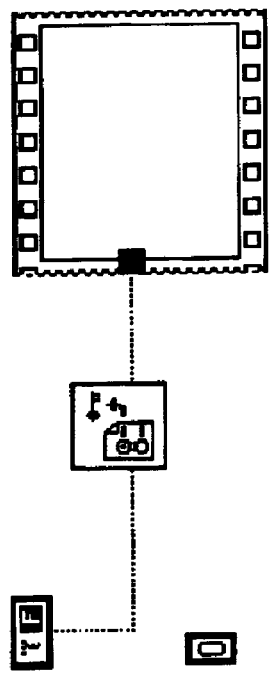
Figure 16B:
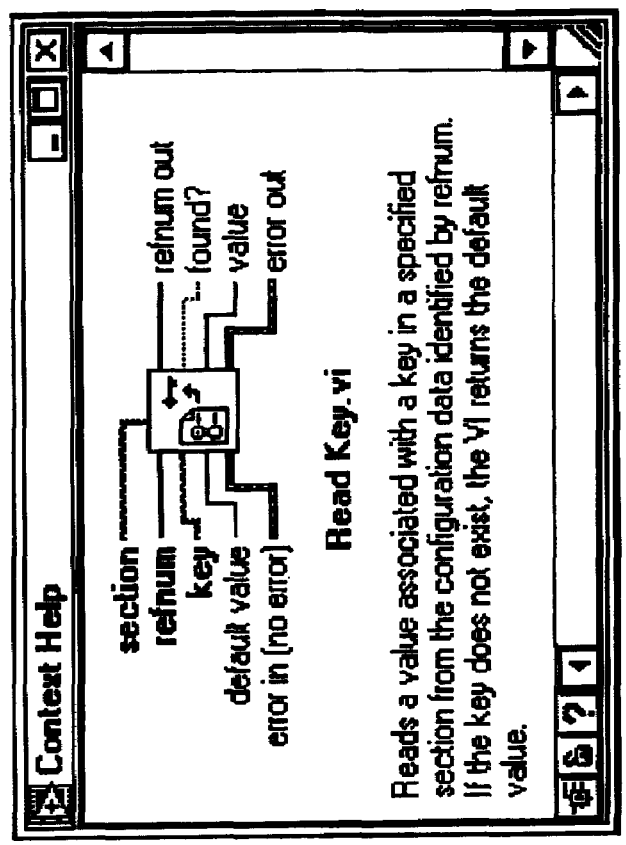
Figure 16B:
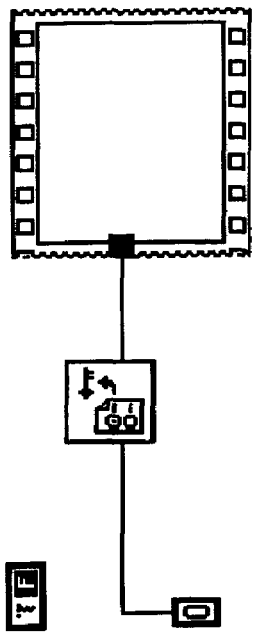

In various embodiments of graphical programming systems and polymorphic nodes, the parameter interface may be represented and specified in any of various ways. For example, in one embodiment, inputs and outputs for a polymorphic node are represented visually in a graphical program diagram as wires connected to the node. (FIGS. 16A and 16B illustrate examples of wiring an input to a polymorphic node.) In such an embodiment, the user may specify the parameter interface for the polymorphic node by choosing an appropriate connector pattern for the node, where the connector pattern specifies the number and/or position of input/output wires connected to the node. For example, the configuration interface may display an icon showing a default connector pattern or connector pane for the node. The user may then click on this icon or select a menu option to display a group of other connector patterns to choose from, as shown in FIG. 7. In other embodiments, the parameter interface may be specified in other ways, e.g., textually, by indicating a number of inputs and a number of outputs to associate with the node, possibly providing a name for the inputs/outputs, etc.

Figure 8:
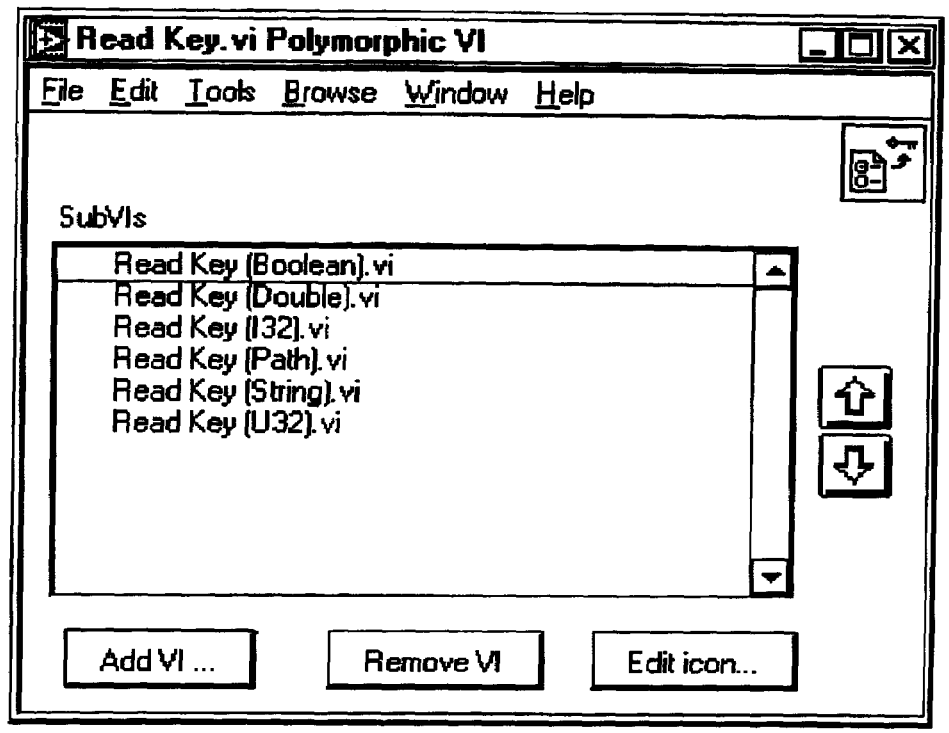
FIG. 8 illustrates an exemplary configuration user interface for a polymorphic node for which several associated functions have been specified.

In step 206 the user may utilize the configuration user interface to associate a set of functions with the polymorphic node. As used herein, a function associated with a polymorphic node refers to a function that may be included in a graphical program; when executed, the function performs a particular operation or runs a subprogram. Thus, the functions associated with a polymorphic node may include subprograms. The user may specify the set of functions in any of various ways, e.g., by clicking the "Add" button shown in FIG. 6 and selecting the desired function or subprogram from a file or palette. As the user associates each function with the polymorphic node, the function may be added to a list displayed in the configuration user interface, e.g., as shown in FIG. 8.

Each of the functions associated with the polymorphic node may have a corresponding function node or subprogram node. Each of these function nodes may have an associated parameter interface, e.g., a connector pattern, describing the inputs/outputs for the function, similar to the parameter interface for the polymorphic node. However, the function node parameter interfaces may also specify a particular data type for each input/output. As described below, the data types of the function node parameter interfaces may be utilized in determining which of the function nodes associated with the polymorphic node to execute in a graphical program.

Figure 9:
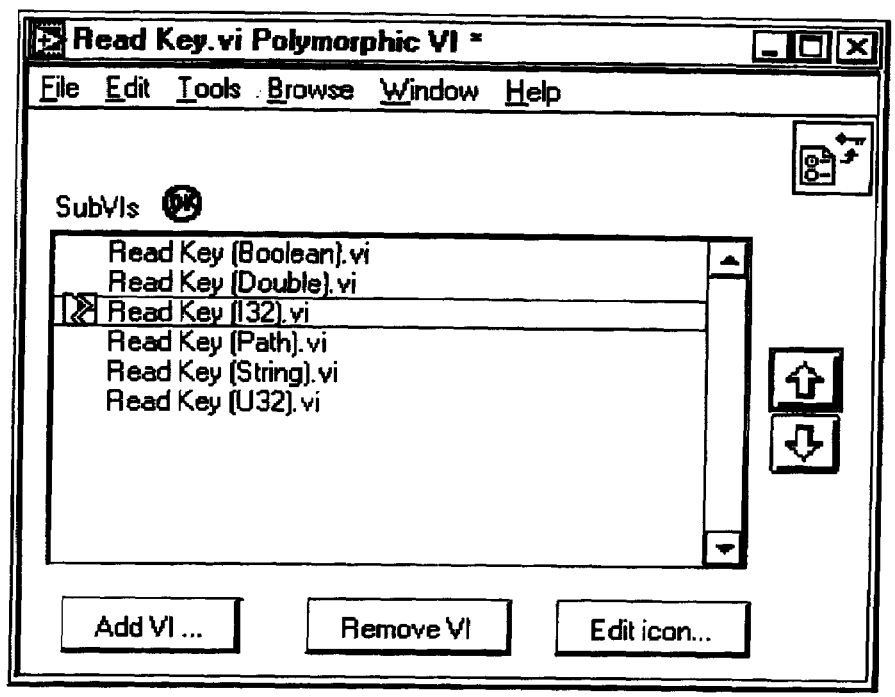
FIG. 9 illustrates the configuration user interface of FIG. 8, wherein one of the associated functions has a parameter interface that is incompatible with the polymorphic node.

When the user adds a function to the set of functions associated with the polymorphic node, the system may check for compatibility between the parameter interface for the function node and the parameter interface for the polymorphic node. If the function node has an incompatible parameter interface, e.g., if the function node allows a greater number of inputs than the polymorphic node, then the incompatibility may be visually indicated in the configuration user interface. For example, FIG. 9 illustrates an icon indicating that the third function in the list has an incompatible parameter interface.

As shown in step 206 of FIG. 4, the user may also specify an ordering for the set of functions associated with the polymorphic node. For example, FIG. 8 illustrates up and down arrows that the user may operate to move a selected function to a different position in the list, where the ordering is specified by the order in which the functions appear in the list. As described below, the ordering of the functions may be used in determining which of the function nodes associated with the polymorphic node to execute in a graphical program.

As noted above, FIG. 4 represents one embodiment of a method for creating and configuring a polymorphic graphical program node, and various steps of FIG. 4 may be altered, added, combined, omitted, reordered, etc. For example, instead of the user explicitly specifying a parameter interface for the polymorphic node, the system may automatically determine a parameter interface for the polymorphic node based on one or more of the parameter interfaces of the associated functions, e.g., by using a parameter interface based on the first of the ordered functions.

As another example, the functions associated with a polymorphic node may themselves be polymorphic functions. In other words, the parameter interfaces for the associated functions may not necessarily specify typed inputs/outputs, but may allow inputs/outputs of multiple data types, thus enabling polymorphic nodes to be nested.

As another example, the polymorphic node configuration user interface may provide other features in addition to those discussed above. For example the FIG. 8 user interface illustrates a "Remove" button for removing functions from the set of functions associated with the polymorphic node. FIG. 8 also illustrates an "Edit icon" button which allows the user to change the appearance of the node associated with a particular function.

It is also noted that FIG. 4 is discussed in terms of a user creating and configuring a polymorphic node. However, a graphical programming system may provide pre-existing polymorphic nodes that users may include in graphical programs. These pre-existing polymorphic nodes may also be configured with a parameter interface and a set of associated functions, as described above.

Figure 10:
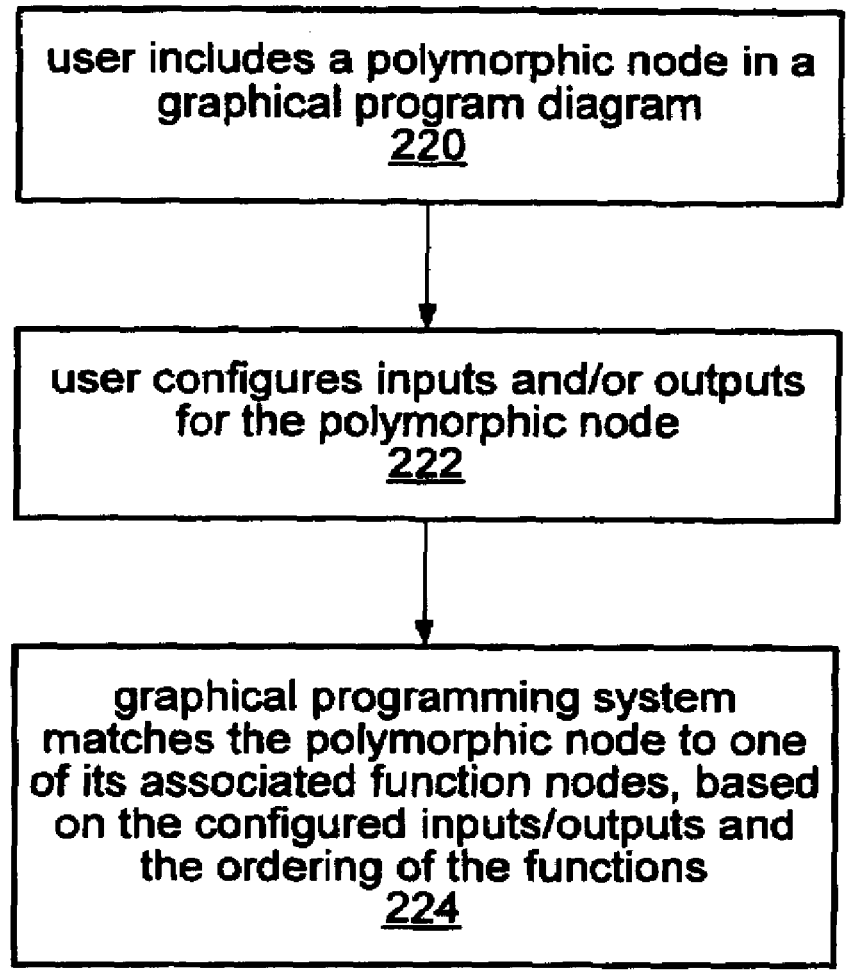
FIG. 10 is a flowchart diagram illustrating one embodiment of a method for using a polymorphic node in a graphical program.

FIG. 10—Using a Polymorphic Node in a Graphical Program

FIG. 10 is a flowchart diagram illustrating one embodiment of a method for using a polymorphic node in a graphical program. In step 220, a user includes a polymorphic node in a graphical program diagram. The included polymorphic node may be a node created and configured by a user or may be a node provided by the graphical programming system or a library included with the graphical programming system. The user may include the polymorphic node in any way supported by a particular implementation. For example, the user may choose the polymorphic node from a palette of available nodes, may specify a file associated with the node, etc. In response to the user including the polymorphic node, the graphical programming system displays the node in the graphical program diagram.

In step 222, the user configures inputs and/or outputs for the polymorphic node, according to the parameter interface specified for the polymorphic node. For example, in one embodiment, the user may connect wires representing inputs or outputs to the polymorphic node, where a data type is associated with each wire. These wires may originate from or terminate at other nodes in the graphical program diagram. FIGS. 16A and 16B illustrate examples of wiring a typed input to a polymorphic node. Inputs and outputs for a polymorphic node may also be specified in any of various other ways, as supported by a particular implementation. For example, a user may specify inputs and outputs to or from a polymorphic node by interacting with a dialog box associated with the node, e.g., in order to associate an input to the polymorphic node with an output produced by another node in the graphical program diagram. As another example, a polymorphic node may be implicitly associated with a user interface control which provides input to the node or with a user interface indicator which displays output from the node.

In step 224, the graphical programming system may match the polymorphic node to one of its associated function nodes, based on the configured polymorphic node inputs/outputs and/or the ordering of the associated functions. Step 224 is discussed in more detail below.

Figure 11A:
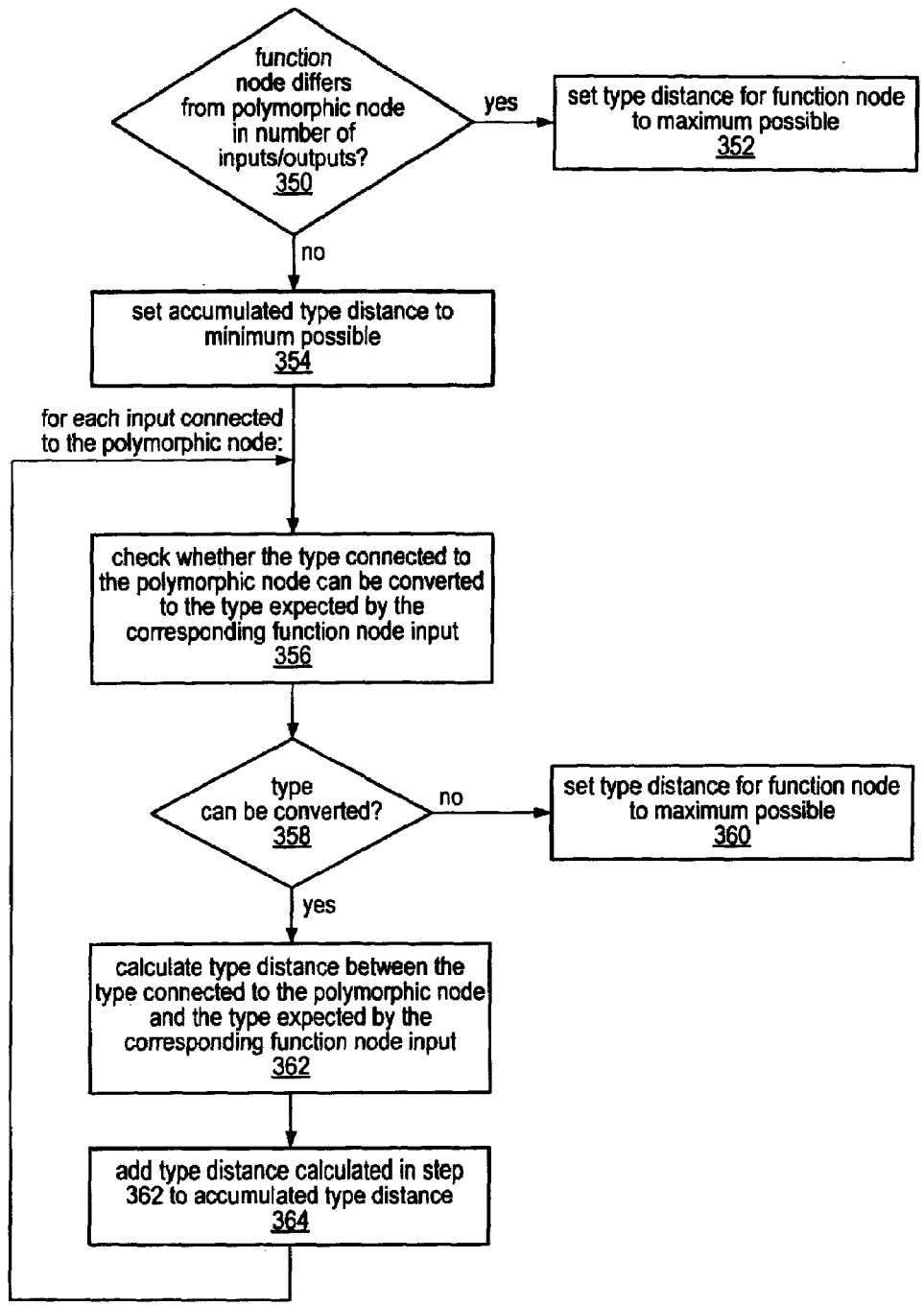
Figure 11C:
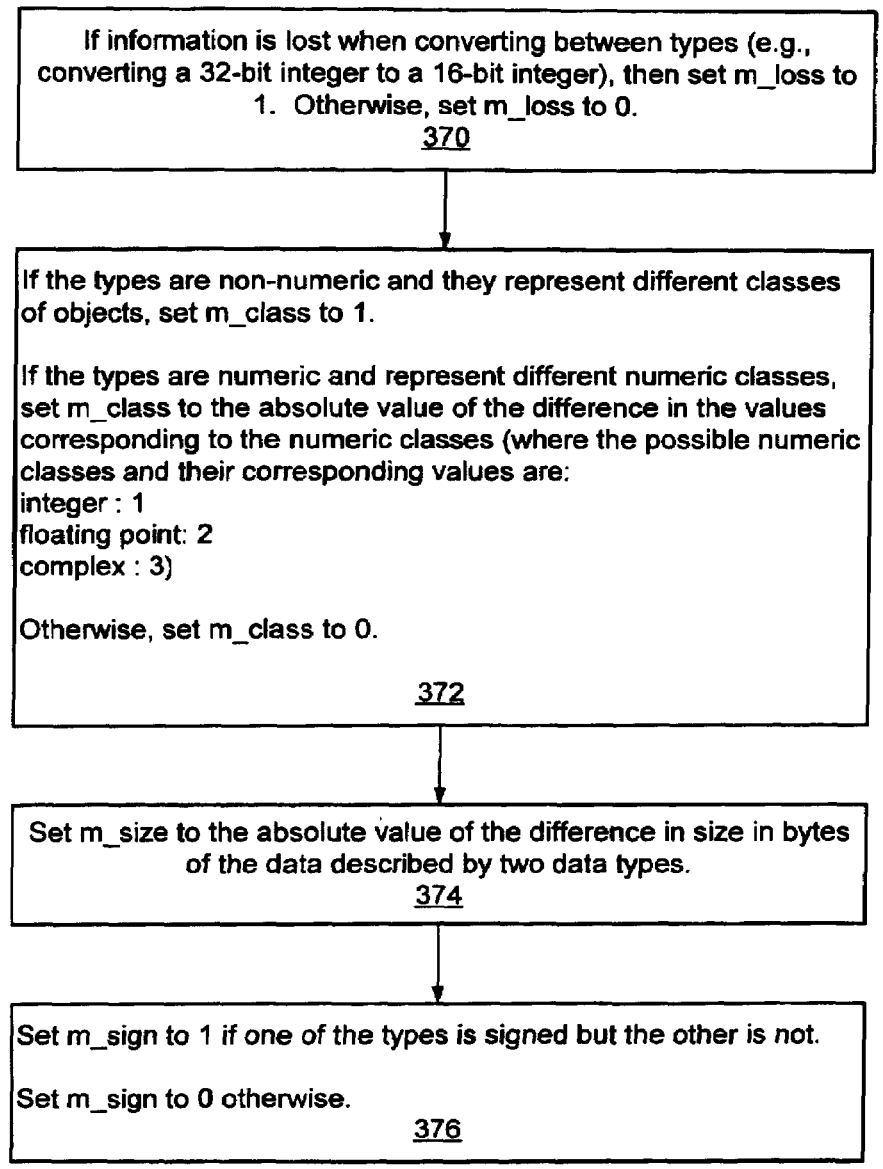
Figure 12:
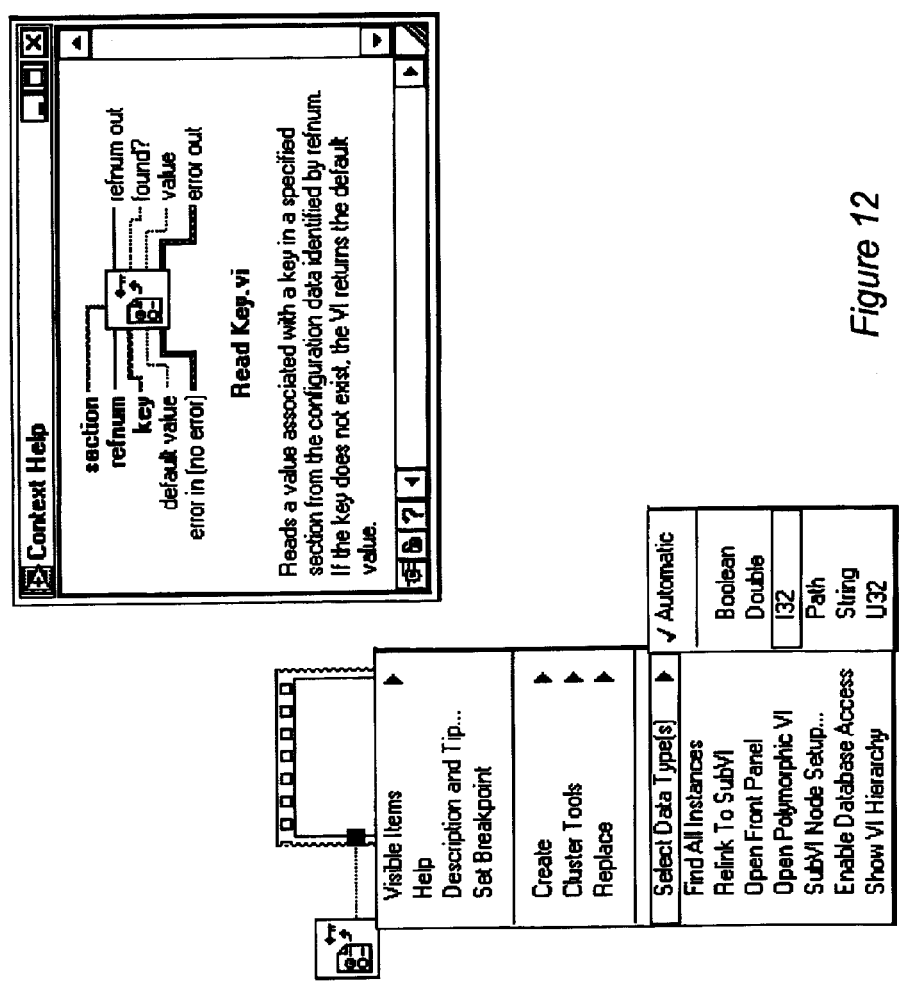

FIGS. 11–12: Matching a Polymorphic Node to an Associated Function Node

In various embodiments, any of various algorithms or heuristics may be utilized in automatically determining which function node a polymorphic node is matched to. This determination may be made at different times during the program development or execution cycle, depending on various characteristics of the graphical programming system. In the preferred embodiment, the graphical programs created by the graphical programming system are strongly typed, i.e., the data types of the inputs and outputs for the polymorphic node are always known at edit time or compile time. In such an embodiment, the function node that a polymorphic node is matched to may be determined instantaneously at edit time or may be determined at compile time. In an alternative embodiment, this determination may be made at runtime, e.g., if the graphical program is not strongly typed.

In one embodiment, a best-fit scoring heuristic may be employed to determine which function node to map a polymorphic node to. In such a heuristic, a series of rules may be applied in a particular order to compare the data type(s) currently connected to or associated with a polymorphic node to the data types expected by the associated function nodes. FIGS. 11A–11C illustrate one example of such a scoring algorithm.

FIG. 11A is a flowchart diagram illustrating an algorithm that may be used to assign a "type distance" to each function node, i.e., a measure of how well the data types of the inputs/outputs currently configured for the polymorphic node match the data types expected by the function node. The algorithm of FIG. 11A may be applied to each function node associated with the polymorphic node, and the system may automatically match the polymorphic node to the function node with the least type distance. If two or more function nodes have the same least type distance, then a default function node may be chosen. For example, the first function that appears in the list of associated functions in the configuration user interface may automatically be chosen. Alternatively, the system may prompt the user to manually choose between the functions, or the configuration user interface may allow the user to specify an explicit order for deciding between ambiguous matches.

In step 350, it is determined whether the number of inputs/outputs for the function node differs from the number of inputs/outputs for the polymorphic node. If so, then the type distance for the function node is set to the maximum possible type distance in step 352.

Otherwise, a value representing the accumulated type distance for the function node is set to the minimum possible in step 354, and steps 356–364 are performed for each input/output connected to or associated with the polymorphic node.

In steps 356 and 358, it is determined whether the data type of the input/output of the polymorphic node can be converted to the data type expected by the corresponding function node input/output. If the data type cannot be converted, then the type distance for the function node is set to the maximum possible type distance.

Otherwise, in step 362, a type distance value representing the difference between the data type connected to the polymorphic node and the data type of the corresponding function node input/output may be calculated. FIGS. 11B–C illustrate one embodiment of a method for performing this calculation.

In step 364, the type distance value calculated in step 362 may be added to the accumulated type distance for the function node. If other inputs/outputs of the polymorphic node are still to be processed, then 356–364 may continue. Otherwise, the accumulated type distance may be used as the type distance for the function node.

Any of various techniques may be used to calculate a type distance value between two data types, as described above for step 362. FIG. 11B illustrates an exemplary data structure for representing such a type distance value. A structure of unsigned 32-bit integers is shown. The structure may be set as described in FIG. 11C. As shown in FIG. 11B, the structure may be treated as a very long integer, with the m_loss field representing the most significant bits and the m_extra field representing the least significant bits.

As shown in FIG. 11C, in step 370, the m_loss field is set. If information is lost when converting between the two types (e.g., as in converting a 32-bit integer to a 16-bit integer), then set m_loss to 1. Otherwise, set m_loss to 0.

In step 372, the m_class field is set. If the two types are non-numeric and they represent different classes of objects, set m_class to 1. If the types are numeric and represent different numeric classes, set m_class to the absolute value of the difference in the values corresponding to the numeric classes. Otherwise, set m_class to 0. In one embodiment, there are three possible numeric classes, with corresponding values as follows:

integer: 1
floating point: 2
complex: 3

In step 374, the m_size field is set to the absolute value of the difference in size in bytes of the data described by two data types.

In step 376, the m_sign field is set to 1 if one of the data types is a signed type and the other is not, or to 0 otherwise.

Note that FIG. 11C does not specify a setting for the m_name or m_extra fields shown in FIG. 11B. These fields may not be used or may be reserved for use by future versions of the type distance algorithm.

As noted above, any of various alternative methods may be used in automatically matching the polymorphic node to a particular function node, and FIGS. 11A–11C are exemplary only.

The graphical programming system may also enable the user to manually specify the function node to which to match a polymorphic node, as shown in the user interface of FIG. 12. This feature may be especially useful, for example, when a polymorphic node allows optional inputs or outputs. For example, the help window shown in FIG. 12 illustrates a "Read Key" polymorphic node for reading data from a configuration data file, wherein the node comprises a "default value" input and a "value" output. In this example, the "default value" input and the "value" output must be of the same data type. However, the "default value" input is configured to be an optional input. Thus, if the "default value" input is not specified, it may not be possible to determine which function node to match to. In this case the user may manually specify the function node to match to.

FIGS. 13–16: Exemplary Graphical Program Diagrams

Figure 13:
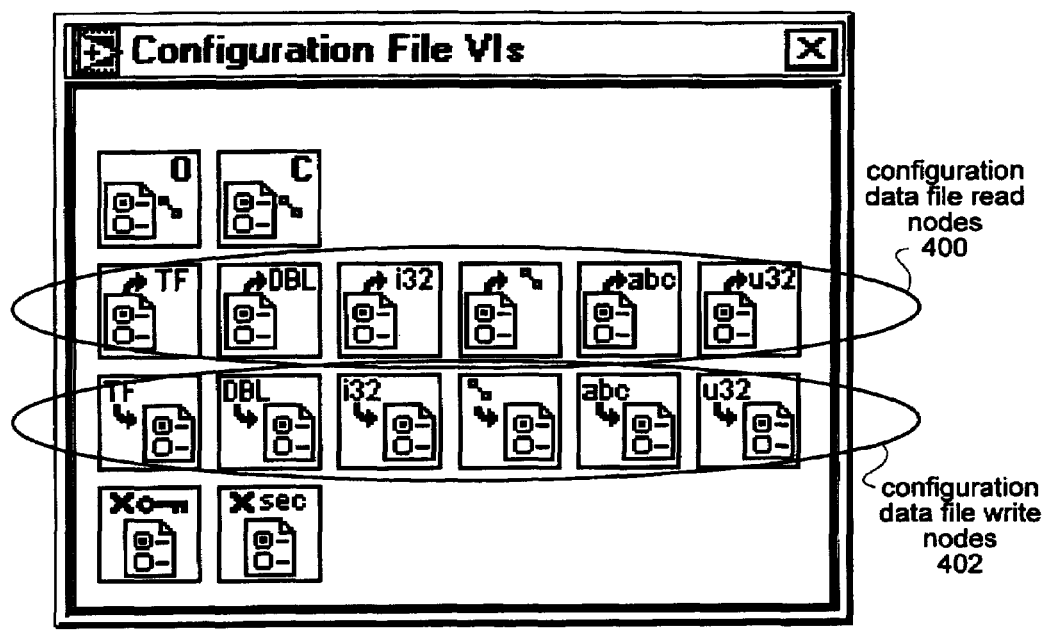
FIG. 13 (prior art) illustrates a group of graphical program function nodes.
Figure 14:
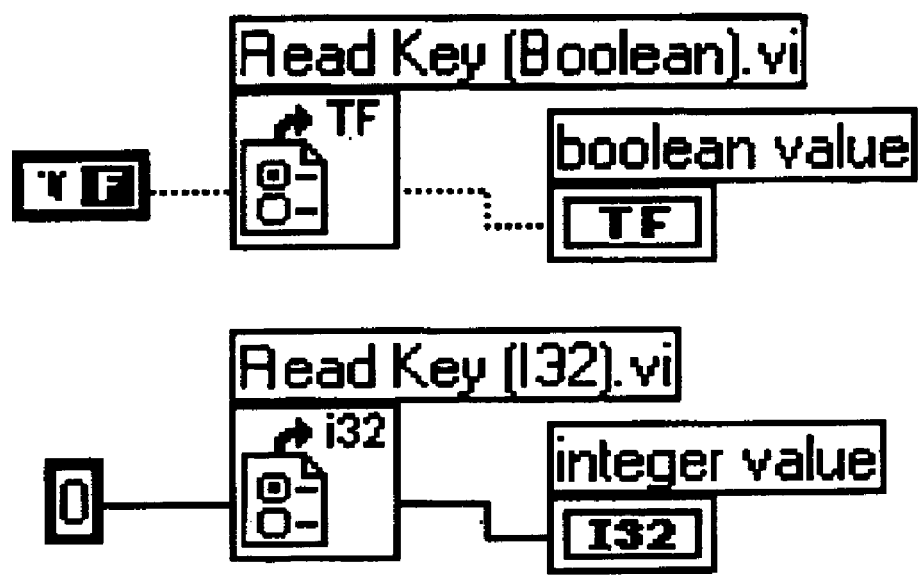
FIG. 14 (prior art) illustrates a graphical program fragment that uses multiple nodes from the group of function nodes illustrated in FIG. 13.

FIG. 13 (prior art) illustrates a group of graphical program function nodes. The group of function nodes shown in FIG. 13 may be provided by a graphical programming system library of function nodes or may be created by a user. The user may display the function nodes shown in FIG. 13, for example, in order to choose a function node to include in a graphical program.

Figure 1B:
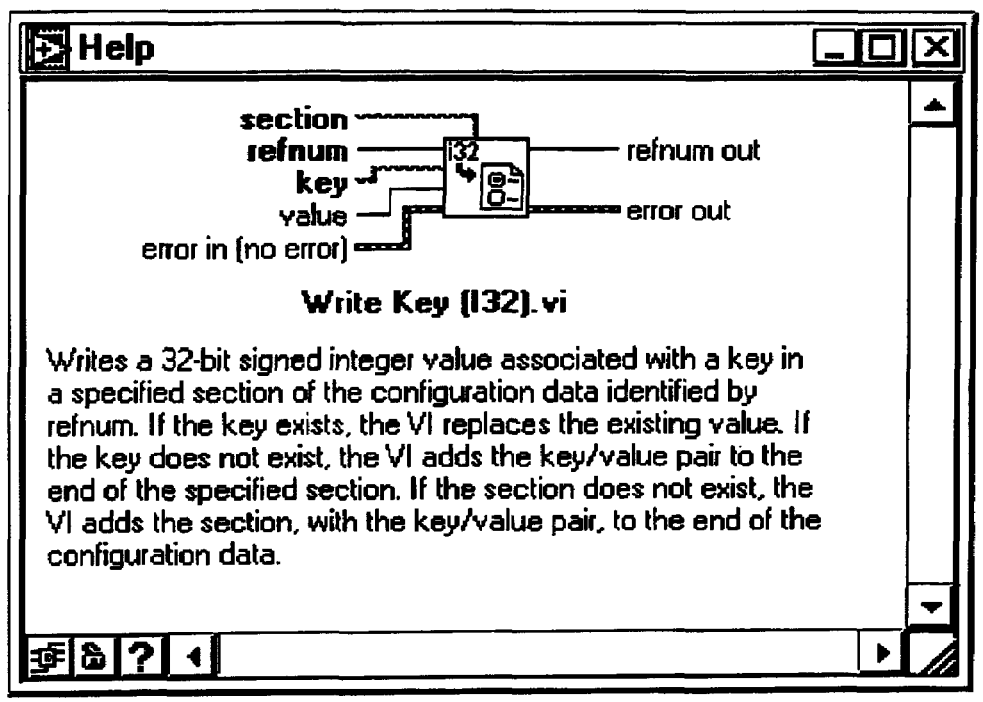

As shown, the group includes a set of function nodes 400 for reading a key value from a system registry and a set of function nodes 402 for writing a key value to a system registry. A system registry may comprise values of various data types, including string values, Boolean values, signed integer values, unsigned integer values, floating point values, etc. Each read node in the set 400 is associated with reading a registry value of a particular data type. Similarly, each write node in the set 402 is associated with writing a value of a particular data type to the registry. (FIGS. 1A and 1B illustrate two of the write nodes of the set 402 in more detail.) Thus, according to the prior art, a graphical program that needs to read (or write) registry values of different data types would need to include a different read (or write) function node for each data type, as shown in the graphical program diagram fragment of FIG. 14 (prior art). Including multiple read (or write) function nodes in this way may have several associated disadvantages, as described above.

Figure 15:
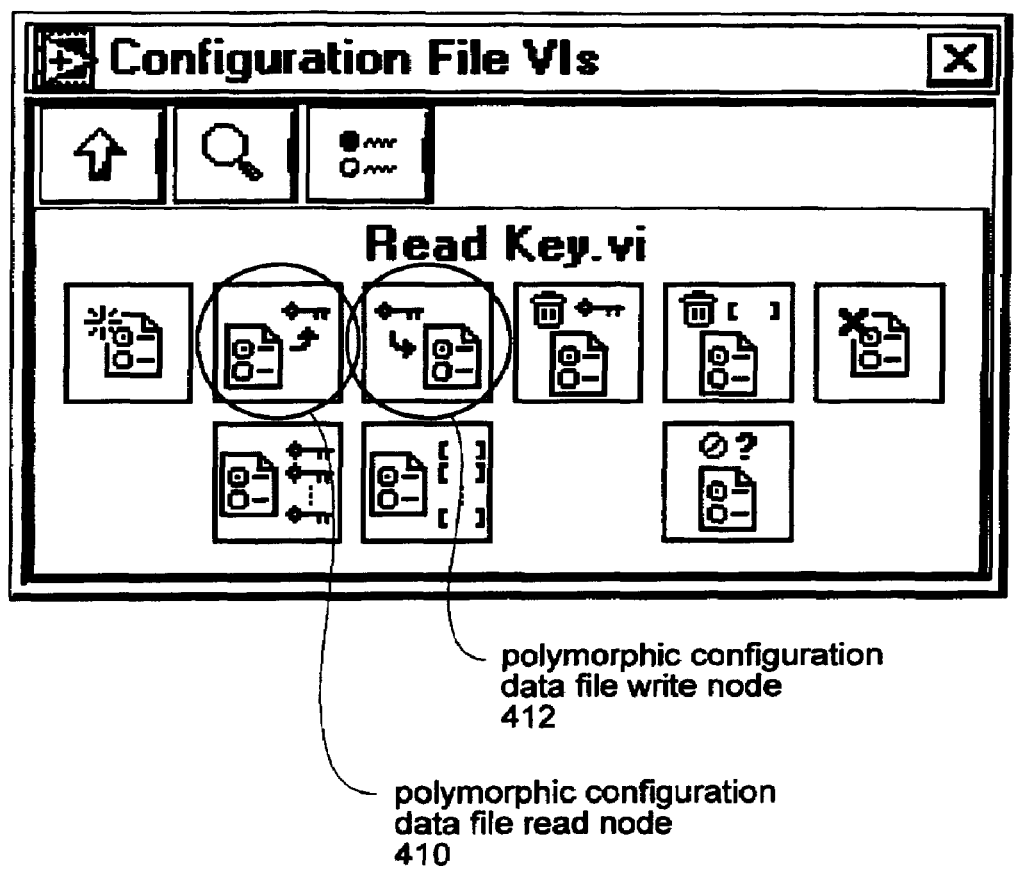
FIG. 15 illustrates the group of graphical program function nodes from FIG. 13, with twelve nodes replaced by an equivalent pair of polymorphic nodes.

FIG. 15 also illustrates a group of function nodes. Similarly as described above, a user may choose from the function nodes shown in FIG. 15 in order to include a node in a graphical program. However, the group of function nodes illustrated in FIG. 15 differs from the group shown in FIG. 13, in that the group includes polymorphic nodes. Thus, instead of a set of nodes for reading registry key values of different data types and another set for writing registry key values of different data types, FIG. 15 illustrates a single polymorphic read node 410 and a single polymorphic write node 412. FIG. 8 illustrates a configuration user interface for the polymorphic read node 410 and shows the set of functions associated with the polymorphic read node 410. In this example, each function in the set corresponds to one of the read nodes illustrated in the set 400 shown in FIG. 13.

Figure 16C:
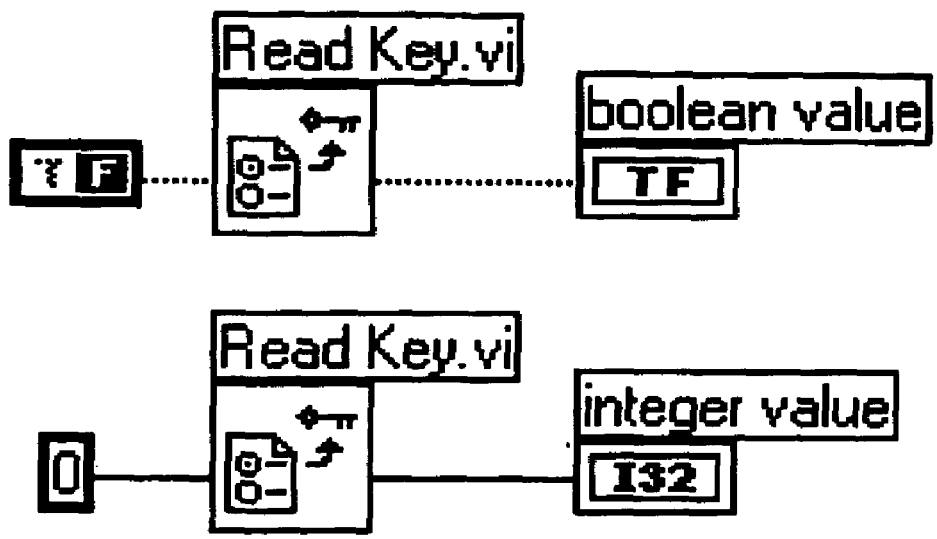

The graphical program diagram fragment illustrated in FIG. 16A includes the polymorphic read node 410 and shows a Boolean input value connected to the polymorphic read node. The graphical programming system is enabled to match the polymorphic node to one of its associated function nodes, based on the Boolean input value, as described above. In this case, the polymorphic node is matched to the "Read Key (Boolean)" function node. The graphical program diagram fragment illustrated in FIG. 16B is similar to that of FIG. 16A, but a signed integer input value is connected to the polymorphic read node instead of a Boolean value. In this case, the polymorphic node is matched to the "Read Key (I32)" function node. FIG. 16C illustrates a graphical program fragment including portions of both FIG. 16A and FIG. 16B, to further illustrate the use of the polymorphic read node 410, where different data types are connected to different instances of the node.

In the examples of FIGS. 16A and 16B, a help window for the polymorphic read node is illustrated. In an alternative embodiment, the graphical programming system may instead or may in addition display a help window for the particular function that the polymorphic node is matched to. In other words, the system may display a help window for the "Read Key (Boolean)" function in FIG. 16A and for the "Read Key (I32)" function in FIG. 16B. Similarly, the node icon shown in both FIGS. 16A and 16B appears as the polymorphic read node icon illustrated in FIG. 15. In an alternative embodiment, the graphical programming system may initially display a polymorphic node icon, but may change the icon to display an icon associated with the particular function that the polymorphic node matches to, once this function is determined.

Figure 17:
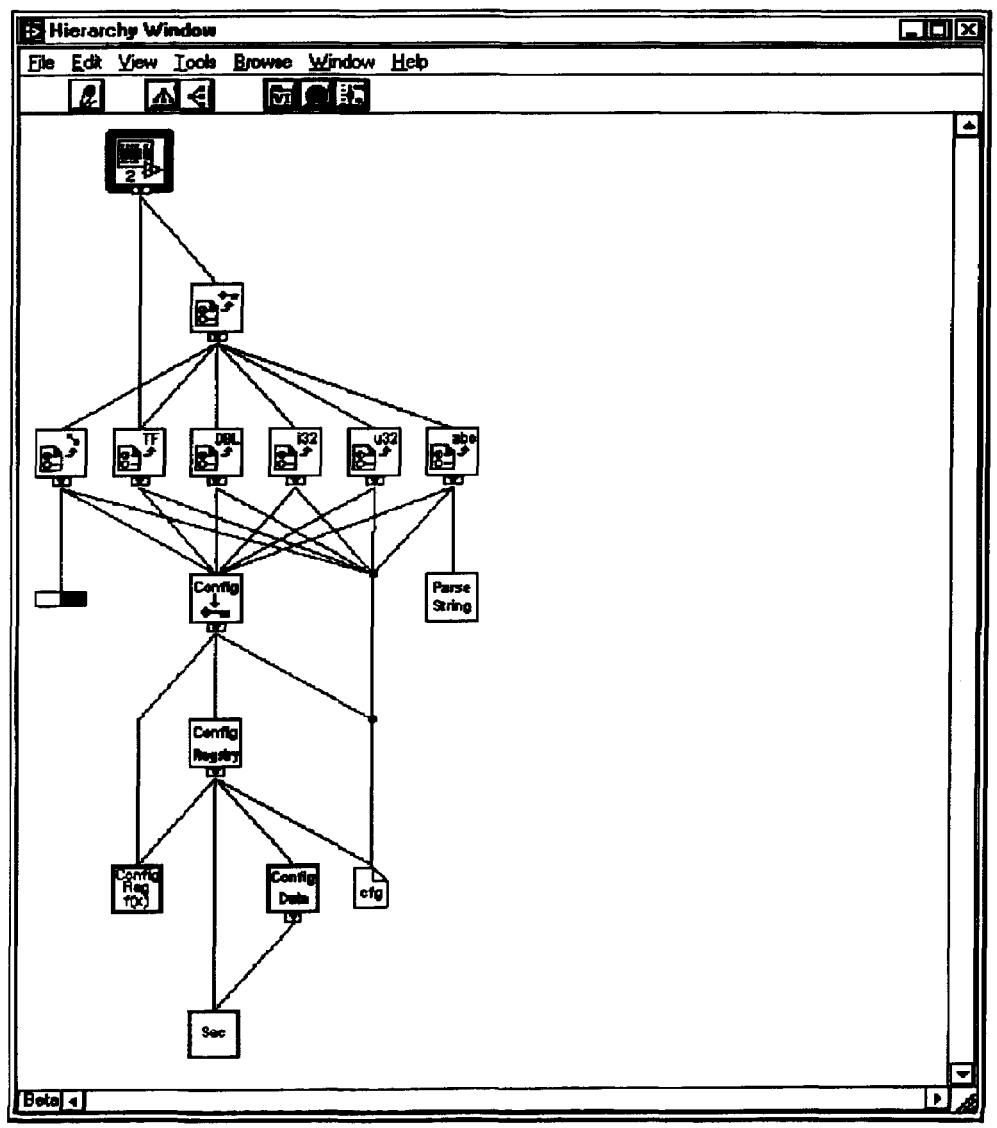
FIG. 17 illustrates an exemplary hierarchy window for a graphical program including a polymorphic node.

FIG. 17—Hierarchy Diagram

In one embodiment, the graphical programming system may be enabled to display a hierarchy window that shows a graphical representation of the calling hierarchy of the function nodes in a graphical program. FIG. 17 illustrates an exemplary hierarchy window for a graphical program including a polymorphic node. As shown, the hierarchy window may display the polymorphic node, as well as nodes for the set of functions associated with the polymorphic node. In various embodiments, the items displayed may differ from the example shown in FIG. 17. For example, the hierarchy may only show the polymorphic node and the function node that the polymorphic node actually matches to, or may only show the function node that the polymorphic node matches to without showing the polymorphic node itself. The hierarchy window may include user-configurable options regarding which items to display.

Graphical Program Compilation and Execution

The hierarchy diagram shown in FIG. 17 illustrates a link from a calling node to both the polymorphic node and to the function node that the polymorphic node matches to. In various embodiments, the actual calling chain performed during execution of the graphical program may vary. In the preferred embodiment, the calling node calls the matched function node directly. In this case, no executable code for the polymorphic node may be generated. As described above, the graphical programming system may be operable to determine the matched function node at edit time or compile time, and thus may generate an executable program exactly as if the user had not included the polymorphic node in the graphical program diagram, but had included the matched function node instead. Thus, the use of polymorphic nodes may not decrease the runtime performance of the program in any way. In this embodiment, the use of polymorphic nodes may be regarded as an edit-time concept that enables the user to work at a higher level of abstraction.

In various alternative embodiments, the graphical programming system may generate executable code for the polymorphic node that is called during execution of the program. For example, in an embodiment in which the graphical programming system does not use a strongly-typed programming style, the polymorphic node may be operable to receive data whose type may be determined at runtime, and the polymorphic node may then call the appropriate function node.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for creating a graphical program comprising a polymorphic node, the method comprising:
including the polymorphic node in the graphical program, wherein the polymorphic node comprises a user-created node, wherein a plurality of functions are associated with the polymorphic node;
configuring one or more parameters for the polymorphic node; and
matching the polymorphic node to one of the plurality of functions, based on the one or more parameters.

2. The method of claim 1,
wherein said matching is performed automatically and is not performed directly in response to user input.

3. The method of claim 1, further comprising:
executing the graphical program, wherein said executing comprises executing the function to which the polymorphic node is matched.

4. The method of claim 3,
wherein no executable code is associated with the polymorphic node;
wherein said executing does not include executing code associated with the polymorphic node.

5. The method of claim 1, further comprising:
creating the polymorphic node in response to a user request.

6. The method of claim 5, further comprising:
receiving user input specifying the plurality of functions to associate with the polymorphic node;
associating the plurality of functions with the polymorphic node in response to the user input.

7. The method of claim 6, further comprising:
receiving user input specifying an ordering for the plurality of functions;
ordering the plurality of functions according to the specified ordering;
wherein said matching the polymorphic node to one of the plurality of functions is also based on the ordering.

8. The method of claim 6, further comprising:
specifying a parameter interface for the polymorphic node, wherein the parameter interface defines acceptable inputs and/or outputs for the polymorphic node;
wherein each of the plurality of functions has a parameter interface compatible with the specified parameter interface for the polymorphic node.

9. The method of claim 8, further comprising:
receiving user input specifying a function with a parameter interface that is incompatible with the specified parameter interface for the polymorphic node;
displaying information indicating that a function with an invalid parameter interface was specified.

10. The method of claim 1,
wherein said configuring the one or more parameters for the polymorphic node comprises configuring the polymorphic node with a first parameter having a first data type;
wherein said matching the polymorphic node to one of the plurality of functions comprises automatically matching the first data type to a data type associated with the matched function.

11. The method of claim 1, wherein said configuring the one or more parameters for the polymorphic node comprises specifying an input parameter to the polymorphic node, wherein the input parameter has an associated data type;

wherein said matching the polymorphic node to one of the plurality of functions comprises automatically matching the data type of the input parameter to an input data type associated with the matched function.

12. The method of claim 11, wherein said specifying the input parameter to the polymorphic node comprises connecting an input wire to the polymorphic node;

wherein the input wire has the associated data type.

13. The method of claim 1, wherein at least one of the functions associated with the polymorphic node is a polymorphic function.

14. A method for creating a polymorphic graphical program node, the method comprising:

receiving user input requesting a polymorphic node to be created;

receiving user input specifying a plurality of functions to associate with the polymorphic node;

creating the polymorphic node, wherein said creating comprises storing information specifying the plurality of functions to associate with the polymorphic node.

15. A system for creating a graphical program comprising a polymorphic node, the system comprising:

a processor;

a memory coupled to the processor, wherein the memory stores a graphical programming application;

a user input device which receives user input;

wherein the graphical programming application is executable in response to the user input to:

include the polymorphic node in the graphical program, wherein the polymorphic node comprises a user-created node, wherein a plurality of functions are associated with the polymorphic node;

configure one or more parameters for the polymorphic node;

match the polymorphic node to one of the plurality of functions, based on the one or more parameters.

16. The system of claim 15, wherein said matching is performed automatically and is not performed directly in response to user input.

17. The system of claim 15, wherein the graphical programming application is further executable to create executable code implementing the graphical program;

wherein the executable code comprises executable code corresponding to the function to which the polymorphic node is matched.

18. The system of claim 17, wherein the executable code created by the graphical programming application does not include executable code for the polymorphic node.

19. The system of claim 15, wherein the graphical programming application is further executable to:

receive user input requesting that the polymorphic node be created and configured;

create and configure the polymorphic node according to the user input.

20. The system of claim 19, wherein the graphical programming application is further executable to:

receive user input specifying the plurality of functions to associate with the polymorphic node;

associate the plurality of functions with the polymorphic node in response to the user input.

21. The system of claim 20, wherein the graphical programming application is further executable to:

receive user input specifying an ordering for the plurality of functions;

order the plurality of functions according to the specified ordering;

wherein said matching the polymorphic node to one of the plurality of functions is also based on the ordering.

22. The system of claim 20, wherein the graphical programming application is further executable to:

receive user input specifying a parameter interface for the polymorphic node, wherein the parameter interface defines acceptable inputs and/or outputs for the polymorphic node;

wherein each of the plurality of functions has a parameter interface compatible with the specified parameter interface for the polymorphic node.

23. The system of claim 22, wherein the graphical programming application is further executable to:

receive user input specifying a function with a parameter interface that is incompatible with the specified parameter interface for the polymorphic node;

display information indicating that a function with an invalid parameter interface was specified.

24. The system of claim 15, wherein said configuring the one or more parameters for the polymorphic node comprises configuring the polymorphic node with a first parameter having a first data type;

wherein said matching the polymorphic node to one of the plurality of functions comprises automatically matching the first data type to a data type associated with the matched function.

25. The system of claim 15, wherein the graphical programming application is further executable to:

receive user input specifying an input parameter to the polymorphic node, wherein the input parameter has an associated data type;

wherein said configuring the one or more parameters for the polymorphic node comprises configuring the polymorphic node with the input parameter specified by the user;

wherein said matching the polymorphic node to one of the plurality of functions comprises automatically matching the data type of the input parameter to an input data type associated with the matched function.

26. The system of claim 25, wherein said receiving user input specifying an input parameter to the polymorphic node comprises receiving user input in response to the user connecting an input wire to the polymorphic node;

wherein the input wire has an associated data type.

27. The system of claim 15, wherein at least one of the functions associated with the polymorphic node is a polymorphic function.

28. A memory medium comprising program instructions executable to:

include a polymorphic node in a graphical program, wherein the polymorphic node comprises a user-created node, wherein a plurality of functions are associated with the polymorphic node;

configure one or more parameters for the polymorphic node;
match the polymorphic node to one of the plurality of functions, based on the one or more parameters.

29. The memory medium of claim 28,
wherein said matching is performed automatically and is not performed directly in response to user input.

30. The memory medium of claim 28, further comprising program instructions executable to:
execute the graphical program, wherein said executing comprises executing the function to which the polymorphic node is matched.

31. The memory medium of claim 30,
wherein no executable code is associated with the polymorphic node;
wherein said executing does not include executing code associated with the polymorphic node.

32. The memory medium of claim 28, further comprising program instructions executable to:
create the polymorphic node in response to a user request.

33. The memory medium of claim 32, further comprising program instructions executable to:
receive user input specifying the plurality of functions to associate with the polymorphic node;
associate the plurality of functions with the polymorphic node in response to the user input.

34. The memory medium of claim 33, further comprising program instructions executable to:
receive user input specifying an ordering for the plurality of functions;
order the plurality of functions according to the specified ordering;
wherein said matching the polymorphic node to one of the plurality of functions is also based on the ordering.

35. The memory medium of claim 33, further comprising program instructions executable to:
receive user input specifying a parameter interface for the polymorphic node, wherein the parameter interface defines acceptable inputs and/or outputs for the polymorphic node;
wherein each of the plurality of functions has a parameter interface compatible with the specified parameter interface for the polymorphic node.

36. The memory medium of claim 35, further comprising program instructions executable to:
receive user input specifying a function with a parameter interface that is incompatible with the specified parameter interface for the polymorphic node;
display information indicating that a function with an invalid parameter interface was specified.

37. The memory medium of claim 28,
wherein said configuring the one or more parameters for the polymorphic node comprises configuring the polymorphic node with a first parameter having a first data type;
wherein said matching the polymorphic node to one of the plurality of functions comprises automatically matching the first data type to a data type associated with the matched function.

38. The memory medium of claim 28,
wherein said configuring the one or more parameters for the polymorphic node comprises receiving user input specifying an input parameter to the polymorphic node, wherein the input parameter has an associated data type;
wherein said matching the polymorphic node to one of the plurality of functions comprises automatically matching the data type of the input parameter to an input data type associated with the matched function.

39. The memory medium of claim 38,
wherein said user input specifying an input parameter to the polymorphic node comprises user input received in response to the user connecting an input wire to the polymorphic node;
wherein the input wire has an associated data type.

40. The memory medium of claim 28,
wherein at least one of the functions associated with the polymorphic node is a polymorphic function.

41. A memory medium comprising program instructions executable to:
associate a plurality of functions with a first node in response to user input;
include the first node in a graphical program in response to user input;
specify one or more parameters for the first node in response to user input; and
programmatically match the first node to one of the plurality of functions, based on the one or more parameters.

42. The memory medium of claim 41,
wherein each of the plurality of functions is a user-defined function.

43. The memory medium of claim 41,
wherein each of the plurality of functions is encapsulated by a subprogram node.

44. The memory medium of claim 41,
wherein each of the plurality of functions is encapsulated by a function node.

45. The memory medium of claim 41, wherein the program instructions are further executable to:
display a user interface for configuring the first node; and
receive user input specifying the plurality of functions to the user interface;
wherein said associating the plurality of functions with the first node in response to user input comprises associating the plurality of functions with the first node in response to the user input to the user interface.

46. The memory medium of claim 45,
wherein said receiving user input specifying the plurality of functions to the user interface comprises receiving user input selecting the plurality of functions from a group of functions displayed by the user interface.

47. The memory medium of claim 41, wherein the program instructions are further executable to:
specify a parameter interface for the first node in response to user input;
wherein each of the plurality of functions has a parameter interface that is compatible with the parameter interface for the first node.

48. The memory medium of claim 47, wherein the program instructions are further executable to:
display a user interface for configuring the first node; and
receive user input specifying the parameter interface for the first node to the user interface.

49. The memory medium of claim 47,
wherein the parameter interface for the first node defines allowable inputs and/or outputs for the first node;
wherein the parameter interface for the first node does not specify data types of the allowable inputs and/or outputs.

50. The memory medium of claim 41, wherein the program instructions are further executable to:
specify an ordering for the plurality of functions associated with the first node in response to user input.

51. The memory medium of claim 50, wherein the program instructions are further executable to:
    display a user interface for configuring the first node; and
    receive user input specifying the ordering to the user interface.

52. The memory medium of claim 41,
    wherein each of the one or more parameters specified for the first node has a data type;
    wherein said matching the first node to one of the plurality of functions comprises matching the first node to one of the plurality of functions based on the data type(s) of the one or more parameters.

53. The memory medium of claim 41,
    wherein said specifying one or more parameters for the first node in response to user input comprises connecting one or more wires to the first node in response to user input.

54. The memory medium of claim 41, wherein the program instructions are further executable to:
    execute the graphical program, wherein said executing comprises executing the function to which the first node is matched.

55. A system comprising:
    a processor; and
    a memory medium storing program instructions;
    wherein the processor is operable to execute the program instructions stored in the memory medium to:
    associate a plurality of functions with a first node in response to user input;
    include the first node in a graphical program in response to user input;
    specify one or more parameters for the first node in response to user input; and
    programmatically match the first node to one of the plurality of functions, based on the one or more parameters.

56. The system of claim 55,
    wherein each of the plurality of functions is a user-defined function.

57. The system of claim 55,
    wherein each of the plurality of functions is encapsulated by a subprogram node.

58. The system of claim 55,
    wherein each of the plurality of functions is encapsulated by a function node.

59. The system of claim 55, wherein the processor is further operable to execute the program instructions stored in the memory medium to:
    display a user interface for configuring the first node; and
    receive user input specifying the plurality of functions to the user interface;
    wherein said associating the plurality of functions with the first node in response to user input comprises associating the plurality of functions with the first node in response to the user input to the user interface.

60. The system of claim 59,
    wherein said receiving user input specifying the plurality of functions to the user interface comprises receiving user input selecting the plurality of functions from a group of functions displayed by the user interface.

61. The system of claim 55, wherein the processor is further operable to execute the program instructions stored in the memory medium to:
    specify a parameter interface for the first node in response to user input;
    wherein each of the plurality of functions has a parameter interface that is compatible with the parameter interface for the first node.

62. The system of claim 61, wherein the processor is further operable to execute the program instructions stored in the memory medium to:
    display a user interface for configuring the first node; and
    receive user input specifying the parameter interface for the first node to the user interface.

63. The system of claim 55, wherein the processor is further operable to execute the program instructions stored in the memory medium to:
    specify an ordering for the plurality of functions associated with the first node in response to user input.

64. The system of claim 63, wherein the processor is further operable to execute the program instructions stored in the memory medium to:
    display a user interface for configuring the first node; and
    receive user input specifying the ordering to the user interface.

65. The system of claim 55,
    wherein each of the one or more parameters specified for the first node has a data type;
    wherein said matching the first node to one of the plurality of functions comprises matching the first node to one of the plurality of functions based on the data type(s) of the one or more parameters.

66. The system of claim 55,
    wherein said specifying one or more parameters for the first node in response to user input comprises connecting one or more wires to the first node in response to user input.

67. The system of claim 55, wherein the processor is further operable to execute the program instructions stored in the memory medium to:
    execute the graphical program, wherein said executing comprises executing the function to which the first node is matched.

68. A method for creating a graphical program comprising a polymorphic node, the method comprising:
    including the polymorphic node in the graphical program, wherein a plurality of functions are associated with the polymorphic node, wherein no executable code is associated with the polymorphic node;
    configuring one or more parameters for the polymorphic node;
    matching the polymorphic node to one of the plurality of functions, based on the one or more parameters; and
    executing the graphical program, wherein said executing comprises executing the function to which the polymorphic node is matched, wherein said executing does not include executing code associated with the polymorphic node.

69. A method for creating a graphical program comprising a polymorphic node, the method comprising:
    receiving user input specifying one or more functions having a parameter interface that is incompatible with a parameter interface for the polymorphic node;
    displaying information indicating that the one or more functions having a parameter interface that is incompatible with the parameter interface for the polymorphic node were specified;
    receiving user input specifying one or more functions having a parameter interface that is compatible with the parameter interface for the polymorphic node;

associating the one or more functions having a parameter interface that is compatible with the parameter interface for the polymorphic node with the polymorphic node;

including the polymorphic node in the graphical program;

configuring one or more parameters for the polymorphic node; and matching the polymorphic node to a function associated with the polymorphic node, based on the one or more parameters.

70. A system for creating a graphical program comprising a polymorphic node, the system comprising:

a processor;

a memory coupled to the processor, wherein the memory stores a graphical programming application;

a user input device which receives user input;

wherein the graphical programming application is executable to:

include the polymorphic node in the graphical program, wherein a plurality of functions are associated with the polymorphic node;

configure at least one parameter for the polymorphic node;

match the polymorphic node to one of the plurality of functions, based on the configured parameter; and create executable code implementing the graphical program;

wherein the executable code comprises executable code corresponding to the function to which the polymorphic node is matched;

wherein the executable code does not include executable code for the polymorphic node.

71. A system for creating a graphical program comprising a polymorphic node, the system comprising:

a processor;

a memory coupled to the processor, wherein the memory stores a graphical programming application;

a user input device which receives user input;

wherein the graphical programming application is executable to:

receive user input specifying one or more functions having a parameter interface that is incompatible with a parameter interface for the polymorphic node;

display information indicating that the one or more functions having a parameter interface that is incompatible with the parameter interface for the polymorphic node were specified;

receive user input specifying one or more functions having a parameter interface that is compatible with the parameter interface for the polymorphic node;

associate the one or more functions having a parameter interface that is compatible with the parameter interface for the polymorphic node with the polymorphic node;

include the polymorphic node in the graphical program;

configure one or more parameters for the polymorphic node; and match the polymorphic node to a function associated with the polymorphic node, based on the one or more parameters.

72. A memory medium comprising program instructions executable to:

include a polymorphic node in a graphical program, wherein a plurality of functions are associated with the polymorphic node, wherein no executable code is associated with the polymorphic node;

configure at least one parameter for the polymorphic node;

match the polymorphic node to one of the plurality of functions, based on the configured parameter; and execute the graphical program, wherein said executing comprises executing the function to which the polymorphic node is matched;

wherein said executing does not include executing code associated with the polymorphic node.

73. A memory medium comprising program instructions executable to:

receive user input specifying one or more functions having a parameter interface that is incompatible with a parameter interface for a polymorphic node;

display information indicating that the one or more functions having a parameter interface that is incompatible with the parameter interface for the polymorphic node were specified;

receive user input specifying one or more functions having a parameter interface that is compatible with the parameter interface for the polymorphic node;

associate the one or more functions having a parameter interface that is compatible with the parameter interface for the polymorphic node with the polymorphic node;

include the polymorphic node in a graphical program;

configure one or more parameters for the polymorphic node; and match the polymorphic node to a function associated with the polymorphic node, based on the one or more parameters.

74. A memory medium comprising program instructions executable to:

associate a plurality of functions with a first node in response to user input;

specify a parameter interface for the first node in response to user input, wherein the parameter interface for the first node defines allowable inputs and/or outputs for the first node, wherein the parameter interface for the first node does not specify data types of the allowable inputs and/or outputs, wherein each of the plurality of functions has a parameter interface that is compatible with the parameter interface for the first node;

include the first node in a graphical program in response to user input;

specify one or more parameters for the first node in response to user input; and programmatically match the first node to one of the plurality of functions, based on the one or more parameters.

* * * * *